United States Patent [19]
Huang et al.

[11] Patent Number: 6,058,101
[45] Date of Patent: May 2, 2000

[54] SYNCHRONIZATION METHOD AND SYSTEM FOR A DIGITAL RECEIVER

[75] Inventors: Yung-Liang Huang; Chun-Chian Lu; Chia-Chi Huang, all of Hsinchu, Taiwan

[73] Assignee: Industrial Technology Research Institute, Taiwan

[21] Appl. No.: 08/872,671

[22] Filed: Jun. 11, 1997

[51] Int. Cl.[7] ................................. H04J 3/06; H04L 7/04
[52] U.S. Cl. ......................... 370/208; 370/503; 375/362
[58] Field of Search ..................................... 370/203, 204, 370/208, 210, 350, 503, 486, 487, 511, 512, 514; 364/301, 724, 725, 158; 708/319, 314, 313; 375/234, 350, 260, 362, 120

[56] References Cited

U.S. PATENT DOCUMENTS

| | | |
|---|---|---|
| 4,393,272 | 7/1983 | Itakura et al. . |
| 5,170,413 | 12/1992 | Hess et al. ................................. 375/38 |
| 5,313,169 | 5/1994 | Fouche et al. . |
| 5,402,334 | 3/1995 | Pecora et al. ........................... 364/158 |
| 5,444,697 | 8/1995 | Leung et al. . |
| 5,479,363 | 12/1995 | Willson, Jr. et al. ................... 364/724 |
| 5,550,812 | 8/1996 | Philips . |
| 5,710,729 | 1/1998 | Feste et al. ............................. 364/724 |
| 5,751,777 | 5/1998 | Zampetti ................................. 375/376 |
| 5,812,523 | 9/1998 | Isaksson et al. ........................ 370/208 |

OTHER PUBLICATIONS

Classen, et al., "Frequency Synchronization Algorithms for OFDM Systems Suitable for Communication over Frequency Selective Fading Channels", IEEE 1655–59, (1994).

Daffara, et al., "A New Frequency Detector for Orthogonal Multicarrier Transmission Techniques", IEEE 804–809 (1995).

Le Floch, et al., "Digital Sound Broadcasting to Mobile Receivers", IEEE 493–503, (1989).

Moose, "A Technique for Orthogonal Frequency Division Multiplexing Frequency Offset Correction", IEEE 2908–14, (1994).

Pollet, et al., "BER Sensitivity of OFDM Systems to Carrier Frequency Offset and Wiener Phase Noise", IEEE 191–193 (1995).

Shelswell, "The COFDM modulation system: the heart of digital audio broadcasting", Electronics & Communication Engineering Journal, 127–136 (Jun., 1995).

*Primary Examiner*—Huy D. Vu
*Assistant Examiner*—Man Phan
*Attorney, Agent, or Firm*—Finnegan, Henderson, Farabow, Garrett & Dunner, L.L.P.

[57] ABSTRACT

A synchronization system and method for obtaining frame, carrier, and sampling synchronization of an input OFDM modulated digital signal having a pseudoperiodic second symbol. The system includes an apparatus for obtaining frame synchronization, and the apparatus includes an envelope detector to detect the first symbol of the input signal, and a differentiator connected to the envelope detector to detect the second symbol. The differentiator includes a first filter having a transfer function $H(z)=(1+z^{-1})$ and a second filter having a transfer function $H_p(z)=(1-z^{-n/2}+z^{-n}-z^{-3n/2})$, where n equals to a number of samples in the input signal. Synchronization of the carrier frequency offset is obtained by first obtaining the fractional carrier frequency offset, and then obtaining the integral carrier frequency offset through a matched filtering process. Sampling frequency synchronization is obtained through the matched filtering process for determining integral carrier frequency offset.

32 Claims, 5 Drawing Sheets

SYNCHRONIZATION METHOD AND SYSTEM FOR A DIGITAL RECEIVER

BACKGROUND OF THE INVENTION

1. Field of the Invention

This invention pertains in general to a synchronization method and system for digital receivers and, more particularly, to a method and system for obtaining frame, carrier, and clock synchronization for digital audio broadcasting and digital video broadcasting systems.

2. Description of the Related Art

Digital audio broadcasting and digital video broadcasting provide high quality signals with minimal multi-path distortion, noise, or signal drop-offs, as commonly seen in analog broadcasting. There have been various attempts to standardize a digital audio broadcasting ("DAB") system for mobile, portable, and fixed receivers. One such standard is the Eureka 147 system. Eureka is a research and development consortium of European governments, corporations, and universities to develop new technologies. Project number 147, began in 1986, focuses on the DAB technology and seeks to implement the technology under a standardized system for both terrestrial and satellite broadcasting. The Eureka 147 system has been adopted in Europe and Canada, and is being considered in the U.S. in conjunction with the "In band, On channel" ("IBOC") system.

An audio input signal of the Eureka 147 DAB system is generally encoded with a masking-pattern universal subband integrated coding and multiplexing ("MUSICAM") to divide a signal into subbands and to minimize hearing threshold and masking to achieve data reduction. Convolutional coding is then performed, followed by re-distribution of data bits in time and frequency, i.e., interleaving, such that the largest error that can occur in a signal block is limited and the ability to correct burst errors is increased. In addition, the Eureka 147 system uses orthogonal frequency division multiplexing ("OFDM") with quadrature phase shift keying ("QPSK") modulation on each carrier to distribute several audio data channels among overlapping carriers. A guard interval is also inserted between data blocks to reduce intersymbol and multipath interference. The modulated DAB signals are then transmitted over multipath channels.

As with many communication systems, synchronization for a DAB system at various communication layers, especially frame, carrier, and clock synchronization at the physical layer, is important. Because of various changes in propagation channels for a DAB system, synchronization is difficult, especially for carrier and clock synchronization. In addition, many algorithms and systems for conventional OFDM systems are incompatible with the Eureka 147 system largely due to the difference in the transmission frame structure of the Eureka system.

As an example, Fouche et al. describe a method and apparatus for realigning local oscillators to lower the complexity of the clock recovery system at the receiver level in U.S. Pat. No. 5,313,169, entitled "Method of Realigning the Local Oscillators of a Receiver and Device For Implementing the Method", issued on May 17, 1994. The method and device are based on two master lines of the OFDM signal spectrum having a fixed frequency difference between them. This difference is used to calculate the variation of the phases of the lines. However, the frequency spectrum of the Eureka 147 system does not have the master lines as described in Fouche et al.

Leuing et al. describe a method and apparatus for frame synchronization in a pure ALOHA system in U.S. Pat. No. 5,444,697, entitled "Method and Apparatus for Frame Synchronization in Mobile OFDM Data Communication", issued Aug. 22, 1995. The method and apparatus require a three-stage synchronization process. An incoming OFDM signal is first detected. The second step in the process is to sample the received signal and measure the correlation, preferably carried out in the frequency domain, between the signal and a reference signal to achieve coarse synchronization. Finally, the synchronization process is completed by calculating the time-shift between coarse and actual synchronization points to determine phase correction to apply to each sub-carrier. However, the described method and apparatus are different from the Eureka 147 system in that in the ALOHA system, synchronization of each OFDM frame is required, and therefore each frame must carry its own synchronization data. In addition, the described method and apparatus do not provide for carrier or clock synchronization.

Philips describes a "System for Broadcasting and Receiving Digital Data, Receiver and Transmitter for Use in Such System" in U.S. Pat. No. 5,550,812 issued on Aug. 27, 1996. Each frame of the digital data in the system described in Philips includes multicarrier data and system symbols, and each symbol includes a set of OFDM carriers at carrier positions within a frequency raster with regular carrier spacing. The frames further include AFC symbols, or frequency reference symbols, each having at each reference peak position a unmodulated carrier having a peak signal power level. The data frame structure described is also different from that of the Eureka 147 system.

In addition, conventional methods and systems for achieving carrier frequency synchronization first estimate the integral frequency offset of the carrier frequency and then compensate for the fractional frequency offset. A method of achieving synchronization of an OFDM is described by Keller et al. in "Orthogonal Frequency Division Multiplex Synchronization Techniques for Wireless Local Area Networks", PIMRC '96, October 1996. However, Keller et al. do not disclose a method and system for synchronizing the Eureka 147 system because Keller et al., use a special signal format absent from the Eureka 147 system.

SUMMARY OF THE INVENTION

Accordingly, the present invention is directed to a synchronization method and system that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the methods and systems particularly pointed out in the written description and claims hereof, as well as the appended drawings.

To achieve these and other advantages, and in accordance with the purpose of the invention as embodied and broadly described, there is provided an apparatus for enhancing a pseudoperiodicity of an OFDM symbol in an input OFDM modulated digital signal. The apparatus includes filter means having a transfer function $H_p(z)=(1-z^{-n/2}+z^{-n}-z^{-3n/2})$, where n is the number of samples in the input signal.

Also in accordance with the invention, there is provided an apparatus for obtaining frame synchronization of an input OFDM modulated digital signal. The input signal has a first symbol, which carries no data and has substantially less signal power than a second symbol, which has pseudoperiodicity. The apparatus includes differentiator means to enhance the pseudoperiodicity of the second symbol by producing a pseudoperiodic waveform. A power ratio between the first symbol and second symbol is compared to a predetermined threshold value to determine the location of the second symbol.

In another aspect, the invention includes envelope detecting means connected to the differentiator means to detect the first symbol of the input signal and to trigger the differentiator means to detect the second symbol.

In yet another aspect, the invention includes filter means connected to the differentiator means. The filter means has a transfer function $H(z)=(1+z^{-1})$.

Further in accordance with the invention, there is provided an apparatus for synchronizing carrier frequency offset in the aforementioned modulated OFDM input signal. The apparatus includes means for obtaining a fractional carrier frequency offset, and means for obtaining an integral carrier frequency offset coupled to an output of the means for obtaining fractional carrier frequency offset, where the integral frequency offset is obtained through a matched filtering process.

In one aspect of the invention, the means for obtaining an integral carrier frequency offset includes fast Fourier transform means to transform a product of the input signal and the output of the means for obtaining fractional carrier frequency offset, multiplying means respectively connected to the fast Fourier transform means and a frequency shifted phase reference means to multiply outputs of the fast Fourier transform means and the frequency shifted phase reference means, inverse fast Fourier transform means coupled to the multiplying means to inversely transform an output of the multiplying means, and peak detection means coupled to the inverse fast Fourier transform means for detecting a peak of an output of the inverse fast Fourier transform means.

In another aspect of the invention, the apparatus includes tracking means coupled to the means for obtaining integral carrier frequency offset for determining whether synchronization has been lost. The tracking means may also be coupled to the means for obtaining fractional carrier frequency offset to serve the same function.

Additionally in accordance with the invention, there is provided a method for synchronizing carrier frequency of the aforementioned OFDM input signal. The method includes the steps of estimating a fractional frequency offset of the carrier frequency offset, and obtaining an integral frequency offset of the carrier frequency offset through a matched filtering process.

In one aspect of the invention, the matched filtering process includes the steps of obtaining a first peak amplitude by matching the input signal with a second symbol corresponding to a first integral frequency offset, obtaining a second peak amplitude by matching the input signal with a second symbol corresponding to a second integral frequency offset, comparing and storing the larger of the first peak amplitude and the second peak amplitude, and repeating the obtaining and comparing steps for all possible integral frequency offsets.

Further in accordance with the invention, there is provided a method for simultaneously obtaining a sampling frequency and an integral carrier frequency offset of the aforementioned modulated OFDM input signal. The method includes a step of obtaining integral frequency offset of the carrier frequency offset through a matched filtering process by considering the estimated fractional frequency offset and the second symbol of the input signal.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and, together with the description, serve to explain the principles of the invention.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

Figure 1:
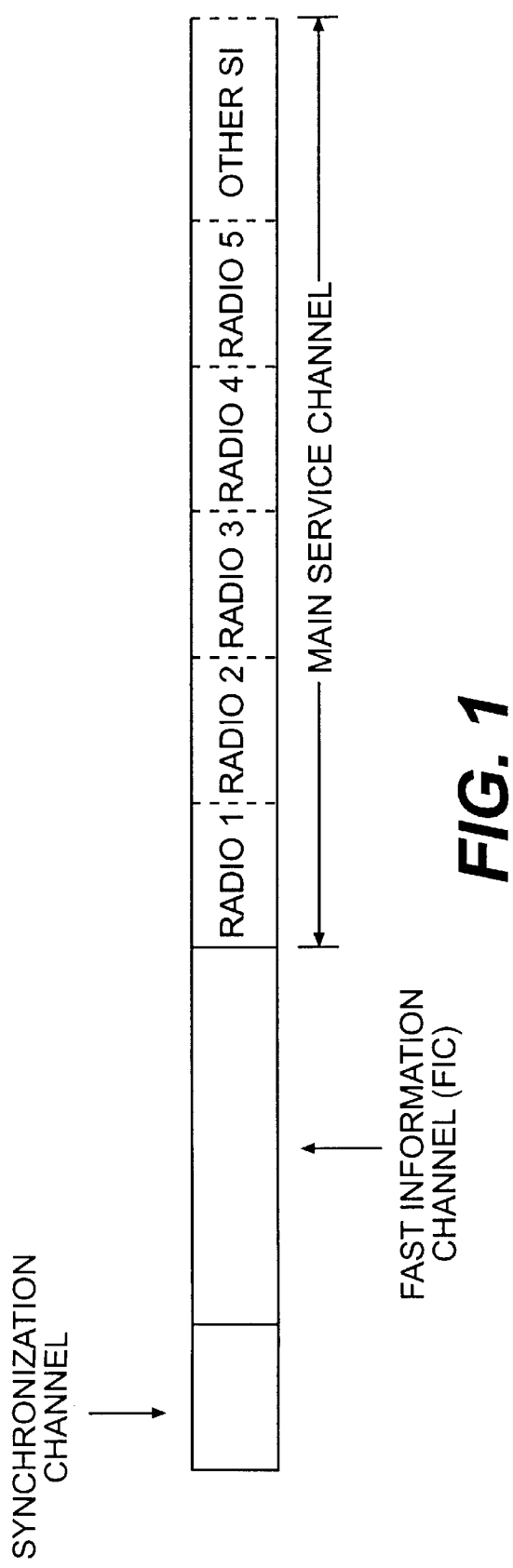
FIG. 1 shows the transmission frame structure of the Eureka 147 system signal.

The Eureka 147 system transmission frame is divided into a synchronization channel, a fast information channel, and a main service channel, as shown in FIG. 1. The channels that constitute the transmission frame consist of a sequence of consecutive OFDM symbols and each consists of a set of equally-spaced carriers. In addition, each of the channels is preceded by a periodic extension of the symbol itself.

As defined under the Eureka 147 system, the synchronization channel always occupies the first two symbols of the transmission frame. The first symbol of the synchronization channel is a null symbol, which is also the first symbol of the transmission frame. The null symbol carries no information, and the DAB signal is primarily noise for the duration of the null symbol. The second symbol of the synchronization channel, which is also the second symbol of the transmission frame, is a phase reference ("PR") symbol that acts as a pilot tone for the next symbol. The synchronization channel therefore serves as the reference for the time information carried in the fast information channel, and is repeated at the transmission frame rate.

Figure 2:
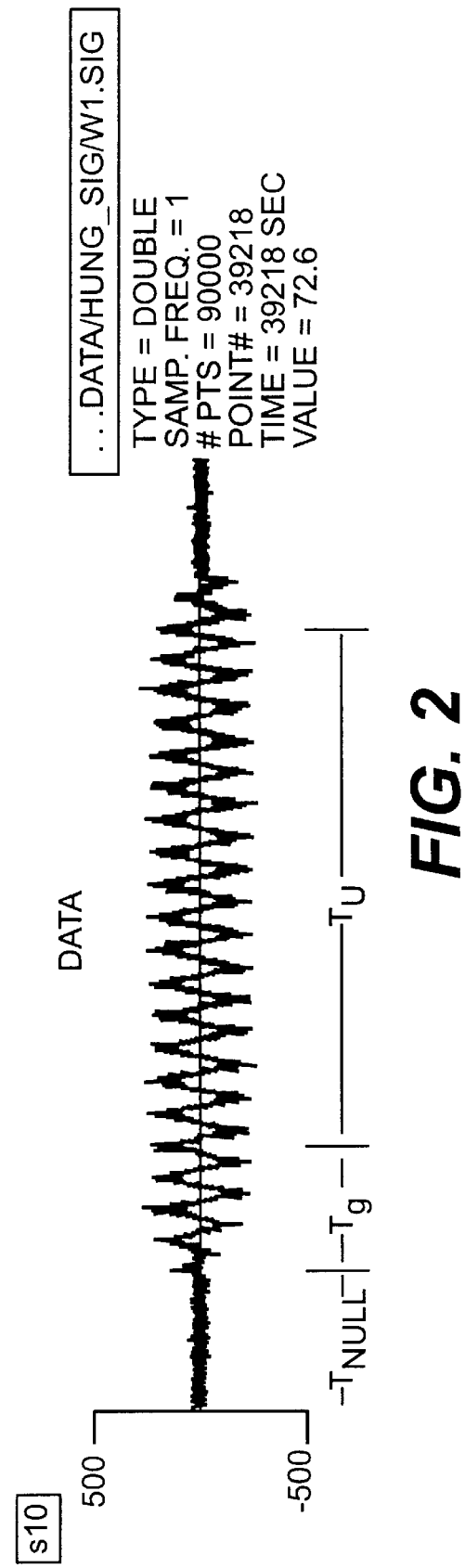
FIG. 2 shows the pseudoperiodicity of a phase reference symbol of the Eureka 147 system signal.

The PR symbol has a pseudoperiodic characteristic as shown in FIG. 2 and differs in each of three transmission modes of the Eureka 147 system in accordance with the network configuration and operating frequencies. In mode 1, for example, this pseudoperiodicity is of 128 samples or bits because of the repetitive pattern of the time-frequency-phase parameters, $h_0j$, $h_1j$, $h_2j$, and $h_3j$, that appear sequentially in the PR symbol. This is shown in the following Table:

| j | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| $h_0 \cdot j$ | 0 | 2 | 0 | 0 | 0 | 0 | 1 | 1 | 2 | 0 | 0 | 0 | 2 | 2 | 1 | 1 |
| $h_1 \cdot j$ | 0 | 3 | 2 | 3 | 0 | 1 | 3 | 0 | 2 | 1 | 2 | 3 | 2 | 3 | 3 | 0 |
| $h_2 \cdot j$ | 0 | 0 | 0 | 2 | 0 | 2 | 1 | 3 | 2 | 2 | 0 | 2 | 2 | 0 | 1 | 3 |
| $h_3 \cdot j$ | 0 | 1 | 2 | 1 | 0 | 3 | 3 | 2 | 2 | 3 | 2 | 1 | 2 | 1 | 3 | 2 |
| j | 16 | 17 | 18 | 19 | 20 | 21 | 22 | 23 | 24 | 25 | 26 | 27 | 28 | 29 | 30 | 31 |
| $h_0 \cdot j$ | 0 | 2 | 0 | 0 | 0 | 0 | 1 | 1 | 2 | 0 | 0 | 0 | 2 | 2 | 1 | 1 |
| $h_1 \cdot j$ | 0 | 3 | 2 | 3 | 0 | 1 | 3 | 0 | 2 | 1 | 2 | 3 | 2 | 3 | 3 | 0 |
| $h_2 \cdot j$ | 0 | 0 | 0 | 2 | 0 | 2 | 1 | 3 | 2 | 2 | 0 | 2 | 2 | 0 | 1 | 3 |
| $h_3 \cdot j$ | 0 | 1 | 2 | 1 | 0 | 3 | 3 | 2 | 2 | 3 | 2 | 1 | 2 | 1 | 3 | 2 |

In accordance with the present invention, this pseudoperiodicity is used to achieve frame, or coarse, synchronization. As described, the PR symbol follows the null symbol. During the null signal, the main OFDM signal strength is approximately equal to zero or that of noise. This characteristic is shown in FIG. 2, wherein $T_{null}$ represents the duration of the null symbol and no OFDM symbols are present during this period. Meanwhile, $T_u$ represents the duration of the OFDM symbols, and $T_g$ represents the duration of a guard interval. Therefore, the PR symbol acts not only as a reference for differential quadrature phase shift key ("QPSK") modulation and demodulation for the next OFDM symbol, but also as a pilot tone for synchronization.

Figure 3:
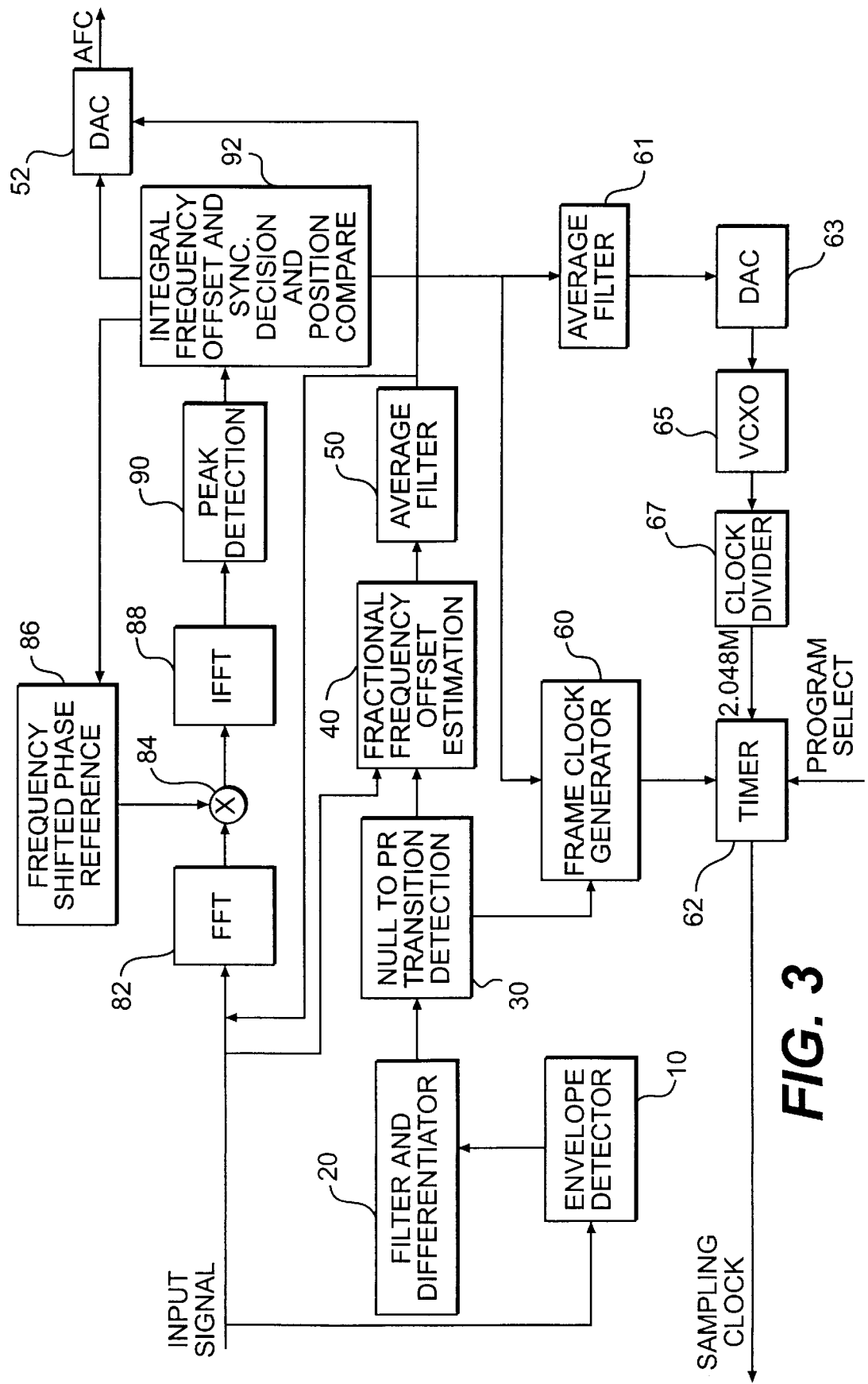
FIG. 3 shows a block diagram of a synchronization system constructed in accordance with the present invention.

Since the signal level of the Eureka 147 system during the null symbol is below that of noise, the null symbol may be detected by an envelope detector. FIG. 3 illustrates a synchronization system constructed in accordance with the present invention. Referring to FIG. 3, an envelope detector 10 receives an input signal and begins detecting for the first symbol of the OFDM input signal, which is the null symbol. Envelope detector 10 also provides the amplitude of the input signal to a filter and differentiator 20. Once the null symbol is detected, envelope detector 10 triggers filter and differentiator 20 for the detection of the second symbol, which is the PR symbol, based on the pseudoperiodicity of the PR symbol. However, as can be seen from FIG. 2, random fluctuations between samples render differentiation of symbols difficult. Thus, filter and differentiator 20 establishes a clear transition from the first symbol, null, to the second symbol, PR, and then a transition detection circuit 30 detects the null to PR transition.

Figure 4:
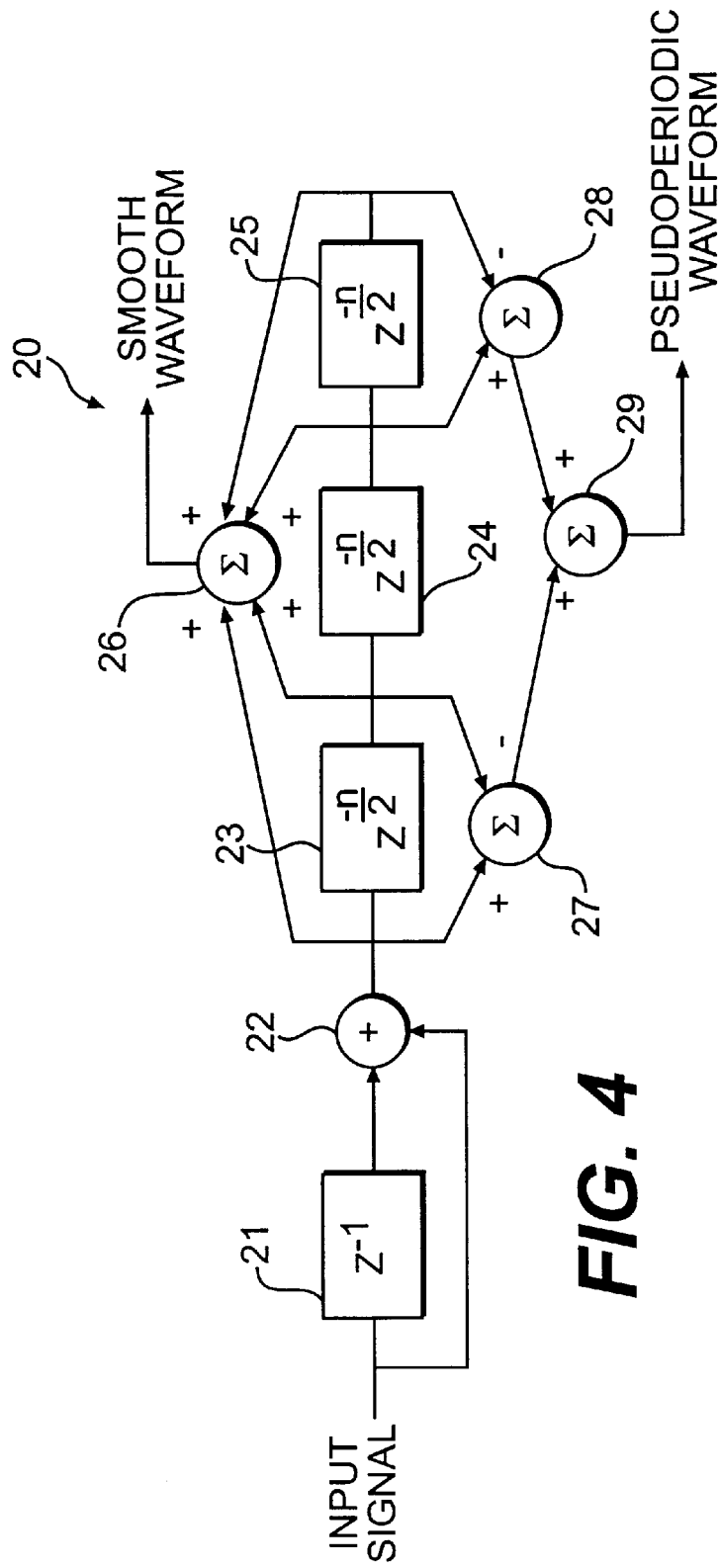
FIG. 4 shows a preferred embodiment of the filter and differentiator circuit of the present invention.

FIG. 4 shows a preferred embodiment of filter and differentiator circuit 20, which generates a smooth waveform and a pseudoperiodic waveform from the input signal. Because an ordinary envelope detector may not provide accurate detection of the null symbol, considering the random fluctuations between samples, the smooth waveform is used to assure the proper detection of the null symbol. In contrast, the pseudoperiodic waveform is used to detect the PR symbol by comparing a PR to null power ratio to a predetermined threshold value. The threshold value may be taken between signal and noise levels to indicate null to PR transition at the beginning of data frames. The signal value, in a digital audio broadcasting system, varies with distance and fading environment. However, the noise level is relatively constant, e.g., thermal noise of approximately −112 dBm. Therefore, the threshold value may be set based on the noise level. After the threshold value has been set, the OFDM symbols in the input signal are compared to the threshold value, and the numbers of samples larger and smaller than the threshold value are separately recorded. The null to PR transition is located when the number of samples having values greater than the threshold value is larger than the number of samples having values smaller than the threshold value. Once the null and PR symbols are detected, frame synchronization is achieved.

The null to PR transition also generates a low rate frame clock used to trigger a sampling clock for fast Fourier transform ("FFT") processing of the symbols for synchronization and DPQSK demodulation. A frame clock generator 60 is triggered by transition detection circuit 30, which detects the null to PR transition in light of the smooth and pseudoperiodic waveforms provided by filter and differentiator 20. Transition detection circuit 30 also detects the transition time between null and PR symbols. Clock generator 60, having been triggered by transition detection circuit 30, provides a frame clock to a timer 62, which may be manually selected by a user. Timer 62 then provides the clock signal to a fast Fourier transform circuit 82. Clock generator 60 also receives a correction to the frame clock from a synchronization decision circuit 92. Additional discussion regarding the generation and correction of frame clock signals is set forth below.

With reference again to FIG. 4, filter and differentiator circuit 20 includes a filter portion and a differentiator portion. The filter portion is a two-tap filter to smooth the sample to sample fluctuations and includes a one-sample delay filter 21 applied to an input signal. An adder 22 combines a delayed input signal with the input signal. The differentiator portion is connected to adder 22 and enhances the pseudoperiodicity characteristic of the second symbol by producing a pseudoperiodic waveform. The enhancement of the pseudoperiodicity characteristic of the second symbol of the input signal may be accomplished by three n/2 th order delay filters 23, 24, and 25, where n is equal to the number of samples in the input signal, and a 4-tap summation. This portion of filter and differentiator 20 obtains the difference between two taps and adds two successive differences to smooth the randomness of the input signal.

In a preferred embodiment, the input signal is provided to a first filter, which includes one-sample delay filter 21 and adder 22. This first filter has a transfer function of $H(z)=(1+z^{-1})$. The pseudoperiodic waveform is produced by providing the output of the first filter to a second filter having a transfer function $H_p(z)=(1-z^{-n/2}+z^{-n}-Z^{-3n/2})$, where n is equal to the number of samples in the input signal. Transfer function $H_p(z)$ is implemented as shown in FIG. 4 through filters 23, 24, and 25, and summation circuits 27, 28, and 29. The smooth waveform may be similarly obtained with a filter having a transfer function of $H_s(z)=(1+z^{-n/2}+z^{-n}+$ $z^{-3n/2}$). The circuit that implements $H_s(z)$ is represented by z-transform filters 23, 24, and 25 and a summation circuit 26.

To illustrate, in mode 1 of the Eureka 147 system, there are 128 samples or bits. In other words, there are 128 samples in a period of PR symbol. The differentiator includes a filter having a transfer function of $H_p(z)=(1-z^{-64}+z^{-128}-z^{-192})$ to produce a pseudoperiodic waveform, and a filter having a transfer function of $H_s(z)=(1+z^{-64}+z^{-128}+z^{-192})$ to produce a smooth waveform. Each of z-transform filters 23, 24, and 25, applies a 64-sample sample delay to the signal applied thereto. Summation circuit 26, respectively connected to filters 23, 24, and 25, adds the respective outputs of filters 23, 24, and 25 to generate the smooth waveform. To generate the pseudoperiodic waveform, summation circuit 27 subtracts the output of filter 23 from the output of adder 22. Summation circuit 28 subtracts the output of filter 25 from the output of filter 24. Finally, summation circuit 29, connected to summation circuits 27 and 28, adds the respective outputs of summing circuits 27 and 28 to produce the pseudoperiodic waveform.

Therefore, frame synchronization of a modulated OFDM digital signal, such as that of the Eureka 147 system, is obtained by first applying an envelope detector to detect the first symbol of the input signal. After detection of the first symbol, the envelope detector triggers a filter and differentiator to begin detection of the second symbol of the input signal. A one-sample delay filter is then applied to the input signal. This is followed by providing a filter having a transfer function of $H_p(z)=(1-z^{-n/2}+z^{-n}-z^{-3n/2})$ to produce a pseudoperiodic waveform to detect the second symbol of the input signal. The multiple locations of peaks of the pseudoperiodic waveform are more accurate indicators of a reference signal frame. If the average value of the peaks is greater than a predetermined threshold level, then the likelihood of a false detection of the PR symbol, or a false alarm, which occurs often in deep fading conditions, may be decreased. Therefore, in a preferred embodiment, the average value and mean location from a predetermined number of peaks of the pseudoperiodic waveform are obtained to more accurately determine the beginning, or end, of the PR symbol.

In addition, a second filter, having a transfer function of $H_s(z)=(1+z^{-n/2}+z^{-n}+z^{-3n/2})$, may be provided to produce a smooth waveform. The smooth and pseudoperiodic waveforms are provided to transition detection circuit 30 to ensure that the first and second symbols have been correctly located because fluctuations between samples may interfere with the ability of the envelope detector to correctly detect and distinguish the first and second symbols. Upon detection of the first and second symbols of the input signal, frame synchronization, or coarse synchronization, will have been achieved.

Figure 5:
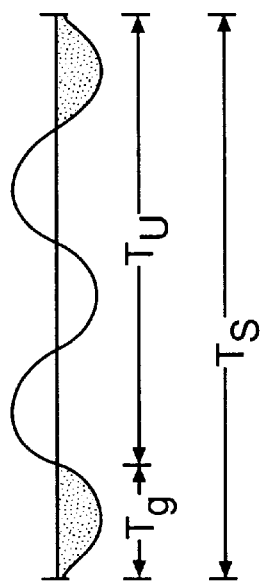
FIG. 5 shows an input OFDM signal having a guard interval inserted.

However, coarsely synchronized OFDM symbols could still be displaced by a fixed time offset to reduce false alarms. This forward timing offset may be tolerated initially by the introduction of a guard interval, as shown in FIGS. 2 and 5. In general, the duration of the guard interval should be long enough to alleviate multipath distortion. The duration of the guard interval $T_g$ of the Eureka 147 signal is approximately ¼ of the symbols' duration $T_u$, and the symbols in the guard interval are reproduced from the final ¼ of the symbols.

In accordance with the present invention, the guard intervals introduced to the Eureka 147 system signals are further used to estimate a fractional frequency offset of the carrier frequency offset. Carrier phase synchronization, or fine tuning, is required after frame synchronization to obtain complete signal synchronization. Conventional methods and systems attain carrier frequency synchronization by first estimating the integral frequency offset of the carrier frequency and then compensating for the fractional frequency offset. In contrast, embodiments in accordance with the present invention first estimate fractional frequency offset and then obtain the integral frequency offset by using the estimated fractional frequency offset as a reference to avoid ambiguity in integral frequency offset estimation as may be encountered with conventional methods and systems. The relationship between guard intervals and estimation of fractional frequency offset is described below.

Referring again to FIG. 5, assuming no noise or fading, the relationship between a complex signal $Z_1$ in the guard interval $T_g$ and a complex signal $Z_2$ in the last quarter of the data symbols, which is equal to signal $Z_1$ delayed a time interval of $T_u$, may be represented as follows:

$$Z_2 = Z_1 \exp[j(2\Pi \Delta f)T_u]$$

where $\Delta f$ is the carrier frequency offset. In addition, $\Delta f = i + \delta$, where i is an integer and $\delta$ is a fractional number. Therefore, $$Z_2 = Z_1 \exp[j2\Pi Tu]$$

and $$\delta = \frac{1}{2\Pi T_u} Arg\left[\frac{Z_2 Z_1^*}{|Z_1|^2}\right]$$

Fractional frequency offset is estimated. This estimation is also applicable to any OFDM symbol, including the PR and those in the fast information and main service channels of the Eureka 147 signals. Therefore, fractional frequency offset may be estimated in many places in a DAB frame as the need arises.

Figure 6:
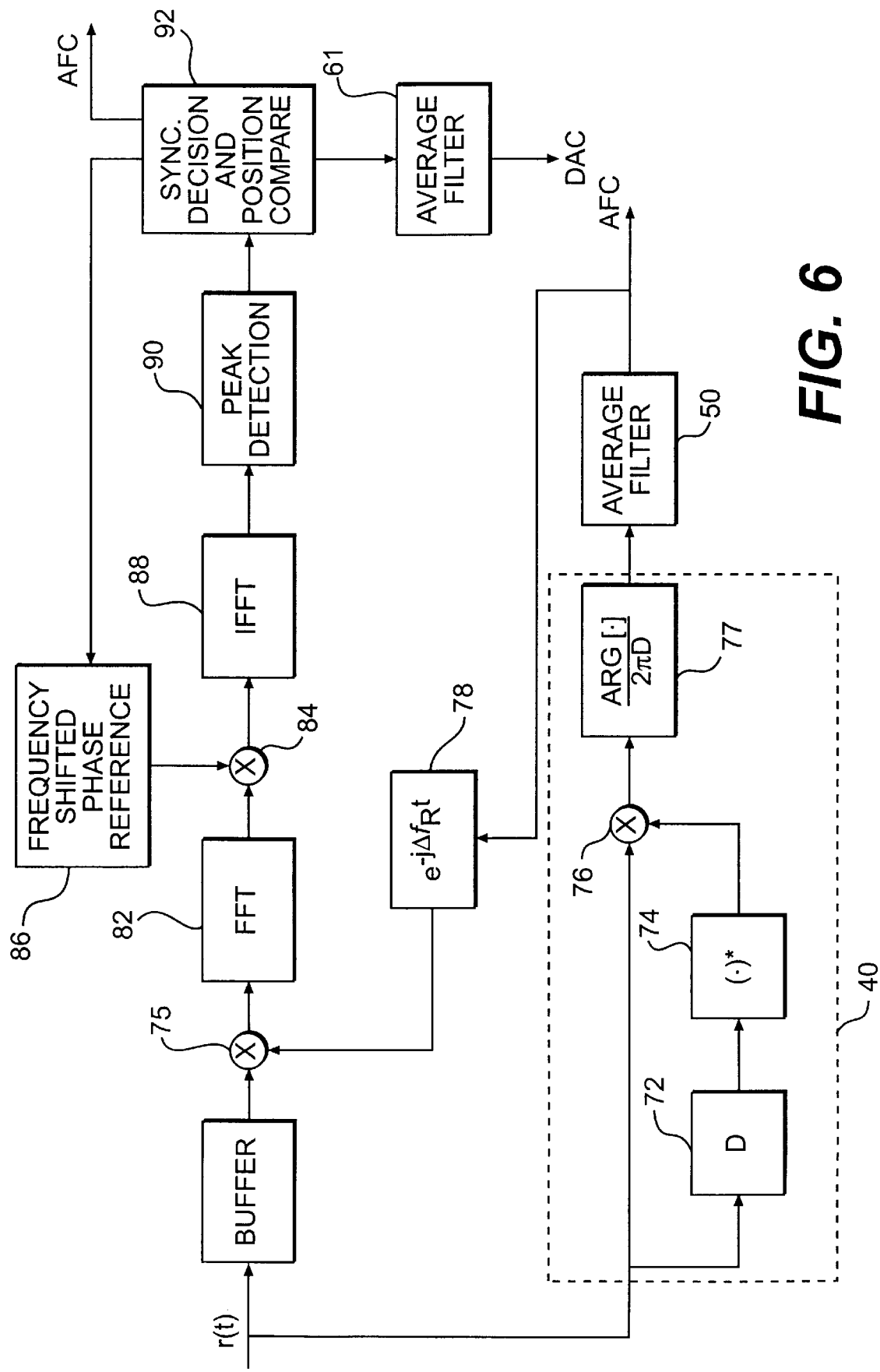
FIG. 6 shows a block diagram of a preferred embodiment of the present invention for obtaining carrier frequency synchronization.

The middle portion of the block diagram in FIG. 3 includes a circuit for estimating fractional frequency offset based on the introduction of the guard interval. An OFDM digital signal r(t) input to the synchronization system is provided to a circuit 40 for fractional frequency offset estimation. A more detailed block diagram of circuit 40 is shown in FIG. 6, which includes a delay circuit 72, a first arithmetic circuit 74, a multiplier circuit 76, and a second arithmetic circuit 77. The input signal r(t) is provided to delay circuit 72 which delays the signal by a delay period equal to that of the signal duration $T_u$. Coupled to delay circuit 72 is first arithmetic circuit 74 to provide a complex conjugate $r^*(t-T_u)$ of an output of delay circuit 72. Coupled to arithmetic circuit 74 is multiplier circuit 76, which also receives the input signal r(t), to multiply the input signal with an output of arithmetic circuit 74. A signal output z(t) from circuit 76 has the following characteristics:

$$z(t) = r(t)r^*(t - T_u)$$

$$= a(t)e^{j2\Pi(\Delta f_I + \Delta f_R)t}a^*(t)e^{-j2\Pi(\Delta f_I + \Delta f_R)(t-Tu)}$$

$$= |a(t)|2 e^{j2\Pi \Delta f_I t + j2\Pi \Delta f_R t - j2\Pi \Delta f_I t + j2\Pi \Delta f_I Tu - j2\Pi \Delta f_R t + j2\Pi \Delta f_R Tu}$$

$$= c e^{j2\Pi \Delta f_R Tu} e^{j2\Pi \Delta f_I Tu}$$

where a(t) and $a^*(t)$ are the amplitudes of the signals r(t) and $r^*(t-T_u)$, respectively, and c is equal to $|a(t)|^2$. In addition, $\Delta f_R$ is the fractional carrier frequency offset and $\Delta f_I$, is the integral carrier frequency offset. Since $\Delta f_I T_u$ is an integer:

$$z(t) = c e^{j2\Pi \Delta f_R T u}$$

$$\Delta f_R = \frac{\arg[z]}{2\Pi T u}$$

In other words, the phase of z(t) obtained during the period is a constant, and is in proportion to the value of $\Delta f_R$. The fractional frequency offset is then compensated by an analog automatic frequency control ("AFC") circuit whenever OFDM symbols occur.

Both FIGS. 3 and 6 show the remaining process for estimation of the fractional frequency offset. The output of circuit 40 of FIG. 3 is produced at the output of second arithmetic circuit 77 of FIG. 6. Arithmetic circuit 77, coupled to multiplier circuit 76, obtains an argument value of the output of multiplier circuit 76 and divides the argument value by a product of two multiplied by n multiplied by the predetermined delay interval, $T_u$. The result is then provided to an average filter circuit 50 to determine the estimated fractional frequency offset $\Delta f_R$ of the input signal. The estimated fraction frequency offset is then subjected to digital-to-analog conversion by a DAC 52 and compensated by the AFC circuit.

After having estimated the fractional frequency offset of the carrier phase, the integral frequency offset may be obtained through matched filtering against PR symbols of residual integral frequency offsets, since the possible residual integral frequency offsets to be matched are limited. Referring again to FIG. 6, an exponential circuit 78 is applied to the estimated fractional frequency offset. A multiplication circuit 75 multiplies the exponential value with the input signal in the frequency domain. The output of multiplication circuit 75 is intended to be matched against several local PR symbols offset by the corresponding integral frequency offsets. However, as calculations in the time domain are complex, an FFT is applied to the output of circuit 75, the output of which is multiplied with a frequency shifted PR symbol and then subject to an inverse FFT operation. The peak of the inversely fast Fourier transformed signal is then detected. More particularly, with reference to FIG. 6, a FFT circuit 82 transforms an output of multiplier 75. An output of circuit 82 is provided to a second multiplying circuit 84, which is respectively connected to circuit 82 and a frequency shifted phase reference circuit 86 to multiply the respective outputs of circuit 82 and frequency shifted phase reference circuit 86. Circuit 86 receives a phase reference in the frequency domain from synchronization tracking circuit 92 shifted by an integer offset determined by circuit 92. The product of multiplying circuit 84 is applied to an inverse FFT circuit 88. A peak detection circuit 90 coupled to the output of inverse FFT circuit 88 detects occurrence of a peak to indicate the carrier frequency offset. Multiplier circuit 84, frequency shifted phase reference circuit 86, inverse FFT circuit 88, and peak detection circuit 90 of FIG. 6 correspond to the circuits designated by the same reference numerals in FIG. 3.

Synchronization tracking circuit 92 also provides for frame clock correction to frame clock generator 60 as described above. Through the matched filtering process, synchronization tracking circuit detects the maximum peak amplitude of an integral frequency offset through a set of possible integral frequency offsets. The coordinate of the integral frequency offset having the maximum value is provided to frame clock generator 60. A correction to the frame clock is also provided if the coordinate of the integral frequency offset is not at zero. Referring to FIG. 3, in addition to providing an input to frame clock generator 60, synchronization tracking circuit 92 provides an input to an average filter 61 and other components that constitute a path for adjusting sampling clock rate at timer 62, if necessary. The sampling clock adjustment loop includes average filter 61, a DAC circuit 63, a VCXO circuit 65, a clock divider 67, and timer 62. Together with synchronization tracking circuit 92 and frame clock generator 60, the sampling clock adjustment loop comprises a path for adjusting sampling clock phase to compensate for frame, or symbol, timing offset.

As described, the carrier frequency offset is determined through matched filtering by using the PR symbol as a reference. During the matched filtering process, one PR symbol will match most closely with the received input signal and will have a peak output, while the other PR symbols will generate noise-like outputs after inverse FFT. This result may be obtained through iteration, where the output of inverse FFT circuit 88 is matched against a PR symbol corresponding to a first integral frequency offset to obtain a first peak amplitude ("PA") and first peak position ("PP"). Another PR symbol corresponding to a second integral frequency offset is matched with the output of multiplication circuit 75 to obtain a second PA and second PP. These two sets of PA and PP are compared and only the information relating to the set with the larger peak amplitude is stored. The process is repeated for all possible integral frequency offsets to detect the integral frequency sought. Because a practical oscillator has frequency stability on the order of several p.p.m., only a few frequency offsetted phase reference symbols are required for the matched filtering process.

Figure 7:
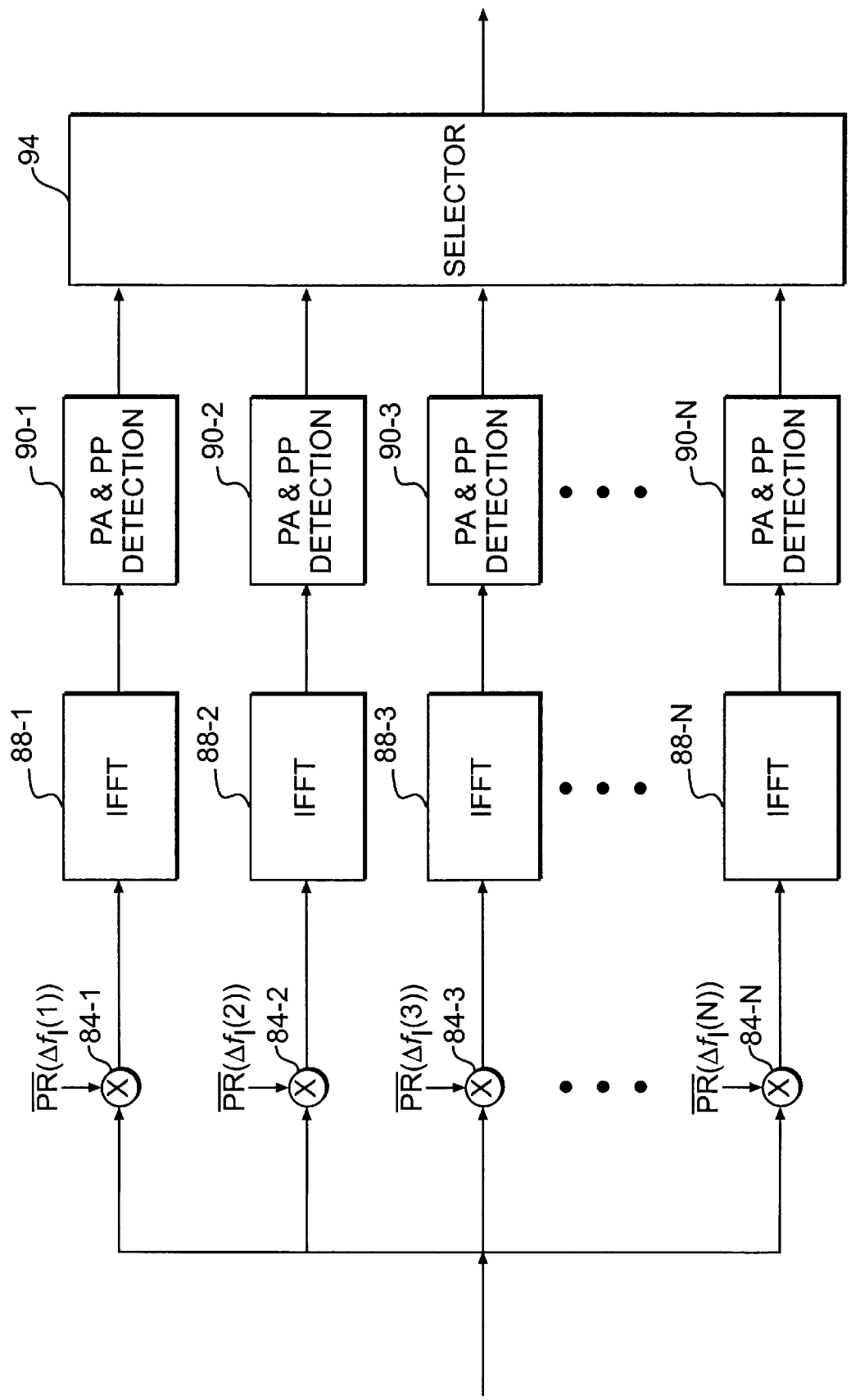
FIG. 7 shows an apparatus for parallel iteration in a matched filtering process of the present invention for obtaining integral carrier frequency offset.

The aforementioned iterative matched filtering process may also be performed in parallel, as shown in FIG. 7. In this embodiment, a plurality of multiplication circuits 84-1, 84-2, 84-3 . . . 84-N, where N is the number of multiplication circuits, are provided. Each of the N multiplication circuits receives an input signal from FFT circuit 82 as shown in FIG. 6, and each is coupled to one of a plurality of inverse FFT circuits 88-1, 88-2, 88-3 . . . 88-N. Each of the plurality of inverse FFT circuits is connected to one of a plurality of peak detection circuits 90-1, 90-2, 90-3 . . . 90-N. The plurality of multiplication circuits, the plurality of inverse FFTs, and the plurality of peak detection circuits correspond to the multiplication circuit 84, inverse FFT circuit 88, and peak detection circuit 90, respectively, of FIGS. 3 and 6. Each of the plurality of peak detection circuits detects peak amplitudes and peak positions corresponding to each possible integral frequency offset. Referring again to FIG. 7, these values are simultaneously provided to a selector 94 which determines the largest peak amplitude. The integral frequency offset that corresponds to the largest peak amplitude is the integral frequency offset sought.

In a preferred embodiment, synchronization tracking circuit 92 as shown in FIG. 3 is included in the synchronization apparatus to compare and ascertain whether previously established synchronization has been lost. If synchronization has not been lost, the synchronization system of the present invention is able to establish synchronization in an expedited manner. The tracking circuit may be designed such that it not only tracks synchronization of carrier frequency offset as a whole, but also fractional and integral frequency offsets individually.

In addition, the byproduct of frequency offset compensation is symbol/clock synchronization. Thus, when there is a match between the PR symbol and the input signal, the position of the peak, PP, is the time difference between the PR symbol and the input signal. Therefore, clock synchronization is also obtained.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for enhancing a pseudoperiodicity of an OFDM symbol in an input OFDM modulated digital signal, comprising:

first filter means having a transfer function $H_p(z)=(1-z^{-n/2}+z^{-n}-z^{-3n/2})$, wherein n is a number of samples in the input signal, for producing a pseudoperiodic waveform.

2. The apparatus as recited in claim 1 further comprising second filter means coupled to said first filter means having a transfer function $H(z)=(1+z^{-1})$ for applying a one-sample delay to the input signal.

3. An apparatus for producing a smooth waveform for use in locating a first symbol in an input OFDM modulated digital signal, the first symbol carrying no data and having substantially less signal power than a second symbol of the input signal, comprising:

first filter means having a transfer function $H_s(z)=(1+z^{-n/2}+z^{-n}+z^{-3n/2})$, wherein n is a number of samples in the input signal, for producing the smooth waveform.

4. The apparatus as recited in claim 3 further comprising second filter means coupled to said first filter means having a transfer function $H(z)=(1+z^{-1})$ for applying a one-sample delay to the input signal.

5. An apparatus for obtaining frame synchronization of an input OFDM modulated digital signal having a first symbol of the input signal carrying no data and having substantially less signal power than a second symbol having pseudoperiodicity, comprising:

differentiator means for enhancing the pseudoperiodicity of the second symbol by producing a pseudoperiodic waveform, wherein a power ratio between the first symbol and second symbol is compared to a predetermined threshold value; and filter means having a transfer function $H(z)=(1+z^{-1})$ coupled to said differentiator means.

6. The apparatus as recited in claim 5 further comprising envelope detecting means coupled to said differentiator means for detecting the first symbol of the input signal and for triggering said differentiator means for detecting the second symbol.

7. The apparatus as recited in claim 5 wherein said threshold value is set based on an average peak value from a predetermined number of peaks of said pseudoperiodic waveform.

8. The apparatus as recited in claim 5 wherein said differentiator means comprises filter means having a transfer function $H_p(z)=(1-z^{-n/2}+z^{-n}-z^{-3n/2})$, wherein n is a number of samples in the input signal, for producing said pseudoperiodic waveform.

9. The apparatus as recited in claim 5 wherein said differentiator means comprises filter means having a transfer function $H_s(z)=(1+z^{-n/2}+z^{-n}+z^{-3n/2})$, wherein n is a number of samples in the input signal, for producing said smooth waveform.

10. The apparatus as recited in claim 5 wherein said differentiator means comprises:

first filter means for applying a delay in the order of n/2 samples to the input signal;

second filter means coupled to said first filter means for applying a delay in the order of n/2 samples to an output of said first filter means; and third filter means coupled to said second filter means for applying a delay in the order of n/2 samples to an output of said second filter means, wherein n is a number of samples in the input signal.

11. The apparatus as recited in claim 10 wherein said differentiator means further comprises first summing means coupled to said first filter means, said second filter means, and said third filter means, for adding said output of said first filter means, said second filter means, and an output of said third filter means to produce a smooth waveform.

12. The apparatus as recited in claim 10 wherein said differentiator means further comprises:

first summing means coupled to said first filter means for subtracting said output from said first filter means from the input signal;

second summing means coupled to said second filter means and said third filter means for subtracting said output from said third filter means from said output of said second filter means; and third summing means coupled to said first summing means and said second summing means for adding an output of said first summing means and an output of said second summing means thereby producing said pseudoperiodic waveform.

13. A method for obtaining frame synchronization of a modulated OFDM digital signal, having a first symbol being the first symbol of the input signal and carrying no data and having substantially less signal power than a second symbol of the input signal, the second symbol having pseudoperiodicity, comprising the step of filtering the input OFDM signal with first filter means having a transfer function of $H_p(z)=(1-z^{-n/2}+z^{-n}-z^{-3n/2})$, wherein n is a number of samples in the input signal.

14. The method as recited in claim 13 further comprising the step of filtering the input OFDM signal with second filter means having a transfer function of $H_s(z)=(1+z^{-n/2}+z^{-n}+z^{-3n/2})$, wherein n is a number of samples in the input signal.

15. The method as recited in claim 13 further comprising the steps of applying envelope detecting means to detect the first symbol of the input signal and triggering said first filter means to detect the second symbol.

16. The method as recited in claim 13 further comprising the step of applying a one-sample delay to the input OFDM signal before filtering with said first filter means.

17. The method as recited in claim 13 further comprising the step of comparing a power ratio between the first symbol and second symbol of the input signal with a predetermined threshold value for detection of the second symbol.

18. An apparatus for synchronizing carrier frequency offset in a modulated OFDM input signal, the signal having a first symbol being the first symbol of the input signal and having substantially less signal power than a second symbol, the second symbol having pseudoperiodicity, comprising:

means for obtaining a fractional carrier frequency offset, and means for obtaining an integral carrier frequency offset coupled to an output of said means for obtaining fractional carrier frequency offset, wherein said integral frequency offset is obtained through a matched filtering process, including circuit means for generating and for shifting a plurality of second symbols, means for compensating the second symbol of the input signal with said fractional carrier frequency; and means for multiplying said compensated second symbol with said plurality of generated and shifted second symbols.

19. An apparatus for synchronizing carrier frequency offset in a modulated OFDM input signal, the signal having a first symbol being the first symbol of the input signal and having substantially less signal power than a second symbol the second symbol having pseudoperiodicity, comprising:

means for obtaining a fractional carrier frequency offset;

means for obtaining an integral carrier frequency offset coupled to an output of said means for obtaining fractional carrier frequency offset, wherein said integral frequency offset is obtained through a matched filtering process; and tracking means coupled to said means for obtaining integral carrier frequency offset for comparing an output of said means for obtaining integral carrier frequency offset with Δ to determine whether synchronization has been lost.

20. An apparatus for synchronizing carrier frequency offset in a modulated OFDM input signal, the signal having a first symbol being the first symbol of the input signal and having substantially less signal power than a second symbol, the second symbol having pseudoperiodicity, comprising:

means for obtaining a fractional carrier frequency offset;

means for obtaining an integral carrier frequency offset coupled to an output of said means for obtaining fractional carrier frequency offset, wherein said integral frequency offset is obtained through a matched filtering process; and tracking means coupled to said means for obtaining fractional carrier frequency offset for comparing an output of said means for obtaining integral carrier frequency offset with a threshold to determine whether synchronization has been lost.

21. An apparatus for synchronizing carrier frequency offset in a modulated OFDM input signal, the signal having a first symbol being the first symbol of the input signal and having substantially less signal power than a second symbol, the second symbol having pseudoperiodicity, comprising:

means for obtaining a fractional carrier frequency offset; and means for obtaining an integral carrier frequency offset coupled to an output of said means for obtaining fractional carrier frequency offset, wherein said integral frequency offset is obtained through a matched filtering process, comprising peak detection means for providing amplitude and position of a peak signal;

a memory coupled to said peak detection means for retaining a plurality of amplitudes and positions of peak signals provided from said peak detection means; and means coupled to said memory for comparing said plurality of amplitudes stored in said memory and for determining one having the largest amplitude.

22. An apparatus for synchronizing carrier frequency offset in a modulated OFDM input signal, the signal having a first symbol being the first symbol of the input signal and having substantially less signal power than a second symbol, the second symbol having pseudoperiodicity, comprising:

means for obtaining a fractional carrier frequency offset, and means for obtaining an integral carrier frequency offset coupled to an output of said means for obtaining fractional carrier frequency offset wherein said integral frequency offset is obtained through a matched filtering process, including peak detection means for providing amplitude and position of a peak signal; and selector means coupled to said plurality of peak detection means for comparing outputs of said plurality of peak detection means.

23. An apparatus for synchronizing carrier frequency offset in a modulated OFDM input signal, the signal having a first symbol being the first symbol of the input signal and having substantially less signal power than a second symbol, the second symbol having pseudoperiodicity, comprising:

means for obtaining a fractional carrier frequency offset, and means for obtaining an integral carrier frequency offset coupled to an output of said means for obtaining fractional carrier frequency offset, wherein said integral frequency offset is obtained through a matched filtering process, including fast Fourier transform means for transforming a product of the input signal and said output of said means for obtaining fractional carrier frequency offset;

multiplying means respectively connected to said fast Fourier transform means and frequency shifted phase reference means for multiplying outputs of said fast Fourier transform means and said frequency shifted phase reference means;

inverse fast Fourier transform means coupled to said multiplying means for inversely transforming an output of said multiplying means; and peak detection means coupled to said inverse fast Fourier transform means for detecting a peak of an output of said inverse fast Fourier transform means.

24. A method for synchronizing a carrier frequency offset of a modulated OFDM input signal, the input signal having a first OFDM symbol being the first symbol of the input signal and having substantially less signal power than a second symbol, the second symbol having pseudoperiodicity, comprising:

estimating a fractional frequency offset of the carrier frequency offset; and obtaining an integral frequency offset of the carrier frequency offset through a matched filtering process, said process being triggered by said estimated fractional frequency offset and including obtaining a first peak amplitude by matching the input signal with a second symbol corresponding to a first integral frequency offset;

obtaining a second peak amplitude by matching the input signal with a second symbol corresponding to a second integral frequency offset;

comparing and storing the larger of said first peak amplitude and said second peak amplitude; and repeating said obtaining and comparing for all possible integral frequency offsets for said estimated fractional frequency offset.

25. A method for synchronizing a carrier frequency offset of a modulated OFDM input signal, the input signal having a first OFDM symbol being the first symbol of the input signal and having substantially less signal power than a second symbol, the second symbol having, pseudoperiodicity, comprising:

estimating a fractional frequency offset of the carrier frequency offset; and obtaining an integral frequency offset of the carrier frequency offset through a matched filtering process, said process being triggered by said estimated fractional frequency offset, wherein said obtaining integral frequency offset includes, generating a plurality of second symbols;

shifting said plurality of second symbols;

compensating the second symbol of the input signal with said fractional frequency offset; and multiplying said plurality of shifted second symbols with said compensated second symbol.

26. A method for simultaneously obtaining a sampling time and an integral carrier frequency offset of a modulated OFDM input signal having a first OFDM symbol being the first symbol of the input signal and having substantially less signal power than a second symbol, the second symbol having pseudoperiodicity, comprising the step of obtaining integral frequency offset of the carrier frequency offset through a matched filtering process, said process being triggered by said estimated fractional frequency offset and the second symbol of the input signal.

27. The method as recited in claim 26 wherein said matched filtering process comprises the steps of:

obtaining a first peak amplitude by matching the input signal with a second symbol corresponding to a first integral frequency offset;

obtaining a second peak amplitude by matching the input signal with a second symbol corresponding to a second integral frequency offset;

comparing and storing the larger of said first peak amplitude and said second peak amplitude; and repeating said obtaining and comparing steps for all possible integral frequency offsets with reference to said estimated fractional frequency offset.

28. The method as recited in claim 26 wherein said step of obtaining integral frequency offset comprises the steps of:

generating a plurality of second symbols;

shifting said plurality of second symbols;

compensating the second symbol of the input signal with said fractional frequency offset; and multiplying said plurality of shifted second symbols with said compensated second symbol.

29. The method as recited in claim 26 wherein said step of obtaining integral frequency offset comprises the steps of:

applying fast Fourier transform to the input signal;

multiplying said fast Fourier transformed signal with a frequency shifted phase reference to produce an output;

applying inverse fast Fourier transform to said output; and detecting a peak in said inversely transformed output wherein a frequency offset at position of said peak represents the integral carrier frequency offset, and represents time difference between the input signal and the second OFDM symbol thereby determining the sampling time.

30. A system for performing frame, carrier frequency, and clock synchronization of a broadcasted input signal based on a Eureka 147 system, comprising:

filter means having a transfer function $H_p(z)=(1-z^{-n/2}+z^{-n}-z^{-3n/2})$, wherein n is a number of samples in the input signal, for producing a pseudoperiodic waveform;

means for obtaining a fractional carrier frequency offset coupled to said filter means, and means for obtaining an integral frequency offset of the carrier frequency offset coupled to said means for obtaining fractional carrier frequency offset, wherein said integral frequency offset is obtained through a matched filtering process by referencing said estimated fractional frequency offset and the second symbol of the input signal.

31. The system as recited in claim 30 further comprising tracking means coupled to said means for obtaining integral frequency offset for determining whether synchronization has been lost.

32. The system as recited in claim 30 further comprising envelope detecting means for detecting a null symbol of the input signal and for triggering said filter means.

* * * * *